(12) United States Patent
Mullaney

(10) Patent No.: US 7,668,432 B2
(45) Date of Patent: Feb. 23, 2010

(54) MULTI-DROP CLOSURE SYSTEMS AND METHODS FOR FIBER OPTIC CABLING

(75) Inventor: Julian Mullaney, Raleigh, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/017,562

(22) Filed: Jan. 22, 2008

(65) Prior Publication Data

US 2008/0181570 A1  Jul. 31, 2008

Related U.S. Application Data

(60) Provisional application No. 60/898,577, filed on Jan. 31, 2007, provisional application No. 60/966,316, filed on Aug. 27, 2007.

(51) Int. Cl.
G02B 6/46 (2006.01)
G02B 6/00 (2006.01)
G02B 6/255 (2006.01)
G02B 6/36 (2006.01)
G02B 6/44 (2006.01)

(52) U.S. Cl. .......................... 385/135; 385/95; 385/99; 385/137; 385/139

(58) Field of Classification Search .................. 385/99, 385/134, 135
See application file for complete search history.

(56) References Cited

U.S. PATENT DOCUMENTS

| | | | |
|---|---|---|---|
| 5,117,067 A * | 5/1992 | Jaycox | 174/38 |
| 5,440,665 A | 8/1995 | Ray et al. | 385/135 |
| 5,449,299 A | 9/1995 | Shimirak et al. | 439/417 |
| 5,528,718 A | 6/1996 | Ray et al. | 385/136 |
| 5,657,413 A | 8/1997 | Ray et al. | 385/139 |
| 6,269,214 B1 * | 7/2001 | Naudin et al. | 385/135 |
| 6,579,014 B2 | 6/2003 | Melton et al. | 385/78 |
| 6,648,520 B2 | 11/2003 | McDonald et al. | 385/78 |
| 7,349,605 B2 * | 3/2008 | Noonan et al. | 385/100 |
| 2001/0036342 A1 | 11/2001 | Knecht et al. | 385/84 |
| 2002/0057870 A1 | 5/2002 | Dean, Jr. et al. | 385/28 |
| 2002/0062977 A1 * | 5/2002 | Battey et al. | 174/93 |
| 2003/0063866 A1 | 4/2003 | Melton et al. | 385/76 |
| 2003/0081910 A1 | 5/2003 | Gimbel et al. | 385/80 |
| 2003/0103750 A1 | 6/2003 | Laporte et al. | 385/134 |
| 2003/0123812 A1 | 7/2003 | Beatty et al. | 385/72 |
| 2003/0210871 A1 | 11/2003 | Rosson et al. | 385/78 |
| 2003/0235374 A1 | 12/2003 | Luther et al. | 385/85 |
| 2004/0047566 A1 | 3/2004 | McDonald et al. | 385/78 |
| 2004/0047567 A1 | 3/2004 | Gimbel et al. | 385/80 |

(Continued)

OTHER PUBLICATIONS

Invitation to Pay Additional Fees for PCT/US2008/000820 dated Jun. 16, 2008.

*Primary Examiner*—Michelle R Connelly Cushwa
(74) *Attorney, Agent, or Firm*—Myers Bigel Sibley & Sajovec

(57) ABSTRACT

Multi-drop closure systems for fiber optic cabling include an enclosure and a ganged drop plug. The enclosure defines a splice chamber therein and has a main cable access opening and a drop cable access opening into the splice chamber. The drop cable access opening is displaced from the main cable access opening. The ganged drop plug is configured to be sealingly inserted into the drop cable access opening. The ganged drop plug has a plurality of drop cables extending therefrom.

15 Claims, 5 Drawing Sheets

U.S. PATENT DOCUMENTS

| | | | |
|---|---|---|---|
| 2004/0101255 A1 | 5/2004 | Dean, Jr. et al. | 385/85 |
| 2004/0114874 A1 | 6/2004 | Bono et al. | 385/53 |
| 2004/0120656 A1 | 6/2004 | Banas et al. | 385/86 |
| 2004/0123998 A1 | 7/2004 | Berglund et al. | 174/92 |
| 2004/0126069 A1 | 7/2004 | Jong et al. | 385/189 |
| 2004/0152354 A1 | 8/2004 | Luther et al. | 439/378 |
| 2004/0252960 A1 | 12/2004 | Battey et al. | 385/135 |
| 2004/0256138 A1* | 12/2004 | Grubish et al. | 174/93 |
| 2005/0031285 A1 | 2/2005 | Barnes et al. | 385/134 |
| 2005/0036742 A1 | 2/2005 | Dean, Jr. et al. | 385/71 |
| 2005/0041926 A1 | 2/2005 | Elkins et al. | 385/53 |
| 2005/0069264 A1 | 3/2005 | Luther et al. | 385/59 |
| 2005/0105873 A1 | 5/2005 | Reagan et al. | 385/135 |
| 2005/0111799 A1 | 5/2005 | Cooke et al. | 385/100 |
| 2005/0111800 A1 | 5/2005 | Cooke et al. | 385/100 |
| 2005/0129375 A1 | 6/2005 | Elkins et al. | 385/100 |
| 2005/0129379 A1 | 6/2005 | Reagan et al. | 385/135 |
| 2005/0145522 A1 | 7/2005 | Bloodworth et al. | 206/409 |
| 2005/0163448 A1 | 7/2005 | Blackwell, Jr. | 385/135 |
| 2005/0175307 A1 | 8/2005 | Battey et al. | 385/135 |
| 2005/0175308 A1 | 8/2005 | Elkins, II et al. | 385/135 |
| 2005/0180705 A1 | 8/2005 | Elkins, II et al. | 385/100 |
| 2005/0185895 A1 | 8/2005 | Keenum et al. | 385/76 |
| 2005/0185910 A1 | 8/2005 | Zimmel | 385/135 |
| 2005/0207711 A1* | 9/2005 | Vo et al. | 385/94 |
| 2005/0220421 A1 | 10/2005 | Keenum et al. | 385/62 |
| 2005/0232567 A1 | 10/2005 | Reagan et al. | 385/135 |
| 2005/0276552 A1* | 12/2005 | Cooke et al. | 385/100 |
| 2006/0222309 A1* | 10/2006 | Grubish et al. | 385/135 |
| 2007/0047895 A1* | 3/2007 | Parikh et al. | 385/135 |
| 2008/0112681 A1* | 5/2008 | Battey et al. | 385/135 |

* cited by examiner

MULTI-DROP CLOSURE SYSTEMS AND METHODS FOR FIBER OPTIC CABLING

RELATED APPLICATIONS

The present application claims priority from U.S. Provisional Application No. 60/898,577, filed Jan. 31, 2007 and U.S. Provisional Application No. 60/966,316, filed Aug. 27, 2007, the disclosures of which are hereby incorporated herein in their entirety by reference.

BACKGROUND OF THE INVENTION

The present invention relates to communication cable termination systems and, more particularly, to optical fiber termination systems and methods for terminating the same.

An extensive infrastructure supporting telecommunication has been developed, traditionally based upon copper wire connections between individual subscribers and telecommunications company network distribution points. More recently, much of the telecommunications network infrastructure is being extended or replaced with an optical fiber based communications network infrastructure. The carrying capacity and communication rate capabilities of such equipment may exceed that provided by conventional copper wired systems.

As such, fiber optic cables are widely used for telecommunications applications where high information capacity, noise immunity and other advantages of optical fibers may be exploited. Fiber cable architectures are emerging for connecting homes and/or business establishments, via optical fibers, to a central location, for example. A trunk or main cable may be routed, for example, through a housing subdivision and small fiber count "drop cables" may be spliced to the main cable at predetermined spaced apart locations.

A typical main cable may be installed underground and have multiple drop cables connected thereto, each of a hundred feet or more. Each of the drop cables, in turn, may be routed to an optical network unit (ONU) serving several homes. Information may then be transmitted optically to the ONU, and into the home, via conventional copper cable technology, although it also has been proposed to extend optical fiber all the way to the home rather than just to the ONU. Thus, the drop cables may serve groups of users, although other architectures may also employ a main cable and one or more drop cables connected thereto.

Unfortunately, the fibers within the main cable must typically be accessed at the various drop points and spliced to respective drop cables after the main cable has already been installed. Accessing the main cable for splicing generally requires careful preparation of the main cable including removing a portion of the cable sheath, and identifying and separating out predetermined fibers from within the cable without disturbing adjacent fibers. The separated fibers may then be spliced and secured within a conventional protective splice closure. Moreover, these cable access and splicing steps must typically be accomplished in the field by a technician who is likely to experience difficulties imposed by weather or the particular location of each of the drop points. Accordingly, field splicing of drop cables to a main cable is typically time consuming, expensive, and may produce low quality optical splices.

SUMMARY OF THE INVENTION

Embodiments of the present invention provide multi-drop closure systems for fiber optic cabling including an enclosure and a ganged drop plug. The enclosure defines a splice chamber therein and has a main cable access opening and a drop cable access opening into the splice chamber. The drop cable access opening is displaced from the main cable access opening. The ganged drop plug is configured to be sealingly inserted into the drop cable access opening. The ganged drop plug has a plurality of drop cables extending therefrom.

In some embodiments, the drop cables are fixedly secured in the ganged drop plug and each of the drop cables includes an outer jacket with at least one optical fiber therein. The drop cables extend from an outer face of the ganged drop plug so as to extend away from the splice chamber when the ganged drop plug is inserted in the drop cable access opening. The respective optical fibers extend from an opposite inner face of the ganged drop plug with the outer jackets removed therefrom so as to extend into the splice chamber when the ganged drop plug is inserted in the drop cable access opening. The respective optical fibers may be ribbonized after extending from the inner face of the ganged drop plug. The outer jackets in some embodiments do not extend from the inner face of the ganged drop plug. Each of the drop cables may also include at least one strength member therein and the strength member(s) also may not extend from the inner face of the ganged drop plug.

In other embodiments, the ganged drop plug is a unitary plug having the drop cables fixedly secured therein. The ganged drop plug may further include a sealing member positioned on an outer circumference thereof that sealingly engages a mating sealing surface of the enclosure positioned in the drop cable access opening. The sealing member may be, for example, an O-ring.

In further embodiments, the enclosure further includes a splice access opening that is sized to allow access for splicing optical fibers in the splice chamber. The enclosure may include a base and a cover and the cover may extend over the splice access opening. The cover may have a closed position covering the splice access opening and an open position allowing access for splicing optical fibers in the splice chamber.

In other embodiments, the enclosure is an inline express enclosure and the main cable access opening includes an entry opening on a first side of the enclosure and an exit opening on a second side of the enclosure, opposite the first side. The enclosure in other embodiments may be a butt enclosure and the main cable access opening may include an entry opening and an exit opening displaced therefrom on a same side of the enclosure. The drop cable access opening may be on the same side of the enclosure as the entry and exit openings.

In further embodiments, the drop cables extend from an outer face of the ganged drop plug a distance selected to allow extension thereof to a subscriber location without a splice between the enclosure and the subscriber location. In some embodiments, the ganged drop plugs are pre-formed in a factory and the drop cables extend from an outer face of the pre-formed ganged drop plug a limited distance selected to be spliced to another cable to allow extension thereof in use to a subscriber location. A plurality of splice enclosures may be provided, each of which is configured to splice at least one of the drop cables extend from the outer face of the pre-formed ganged drop plug to another cable. The plurality of splice enclosures may be one time use splice enclosures not configured for repeated re-entry.

In yet other embodiments, the main cable access opening includes a main cable entrance opening and a main cable exit opening. The system further includes a fiber optic main cable having a strength member and a plurality of optical fibers extending therein within an outer cable sheath. The main cable extends through the splice chamber from the main cable entrance opening to a main cable exit opening. Ones of the optical fibers of the main cable are spliced to corresponding ones of the optical fibers of the drop cables.

In further embodiments, a multi-drop closure system for fiber optic cabling includes an enclosure defining a splice chamber therein. A main cable access opening in the enclosure extends to the splice chamber. A plurality of drop cable access openings in the enclosure also extend into the splice chamber. The drop cable access openings are displaced from the main cable access opening. A plurality of drop cables of a selected length are fixedly and sealingly positioned in corresponding ones of the drop cable access openings and extend therefrom away from the enclosure. Each of the drop cables may include an outer jacket with at least one optical fiber therein wherein the respective optical fibers extend into the splice chamber from the drop cable access openings with the outer jackets removed therefrom. The respective optical fibers may be ribbonized after extending from the inner face of the ganged drop plug. The enclosure may be an inline express enclosure or a butt enclosure.

In other embodiments, methods of terminating an optical fiber cable are provided. An enclosure and ganged drop plug as described above are provided. A main cable is extended into (or through) the main cable access opening. The ganged drop plug is inserted in the drop cable access opening with the optical fibers of the drop cables extending into the splice chamber. Selected ones of a plurality of optical fibers of the main cable are exposed inside the splice chamber. Ones of the optical fibers of the drop cable are spliced to corresponding ones of the selected optical fibers of the main cable in the splice chamber. The splice chamber is environmentally sealed with the splices therein. In some embodiments, operation further include splicing ends of the optical fibers of the drop cables opposite ends of the optical fibers spliced to the optical fibers of the main cable to optical fiber drop cables extending to customer location in at least one splice closure displaced from the enclosure.

In yet further embodiments, a ganged drop plug for insertion into an opening of an enclosure includes a body portion configured to be sealingly inserted into the opening. A plurality of drop cables are fixedly secured in the body portion and extend therefrom in a first direction. Each of the drop cables includes an outer jacket with at least one optical fiber therein. The respective optical fibers extend from the body portion in a second direction, opposite from the first direction, with the outer jackets removed therefrom. The respective optical fibers may be ribbonized after extending from the body portion and the outer jackets may not extend from the body portion in the second direction. The body portion may further include a sealing member configured to sealingly engage a mating sealing surface of the opening.

DETAILED DESCRIPTION OF EMBODIMENTS OF THE INVENTION

Figure 1:
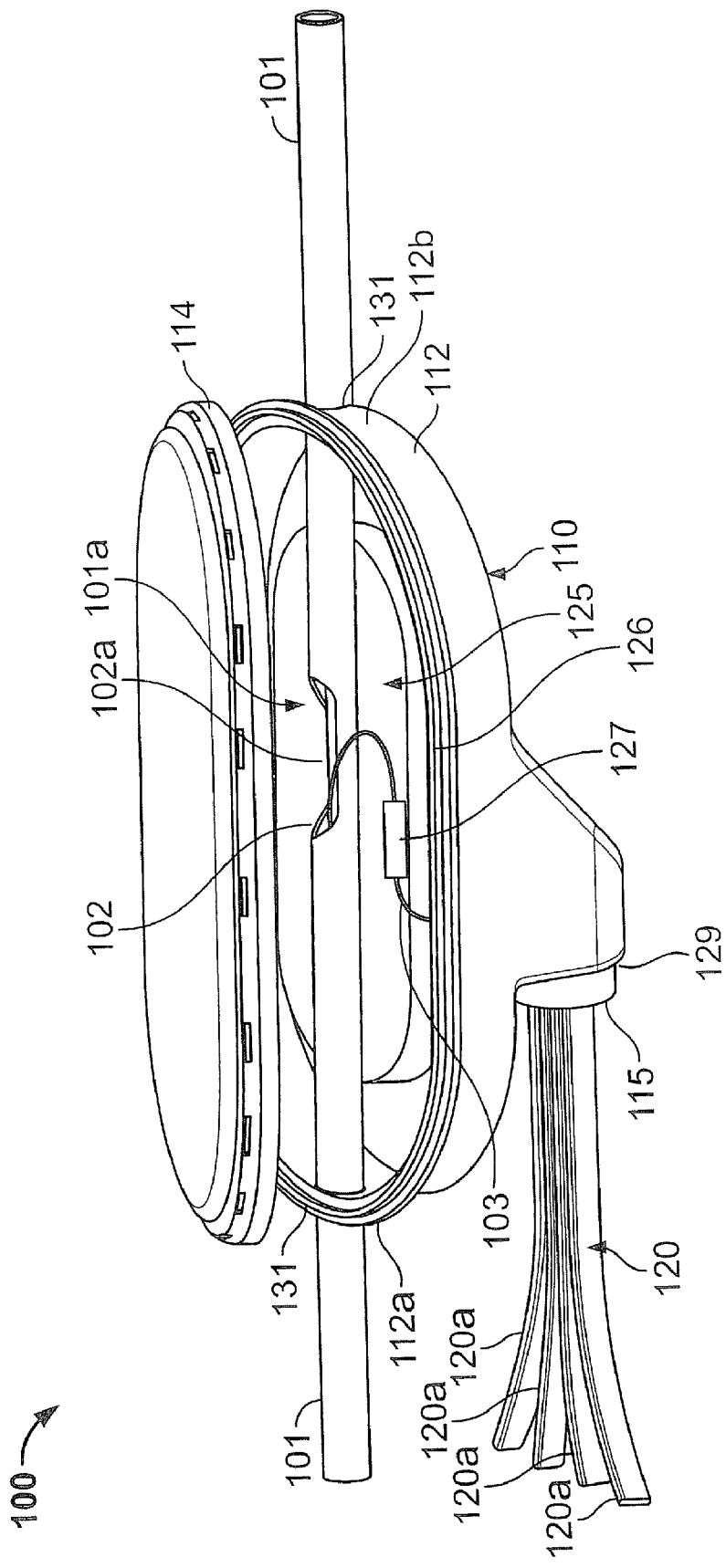
FIG. 1 is a perspective view illustrating an inline style multi-drop closure system according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Some embodiments of the present invention provide an enclosure system for use with fiber optic cabling. The enclosure system may make it easier to access and splice fibers running to living units or other customer locations at or near the end of fiber runs.

Figure 2:
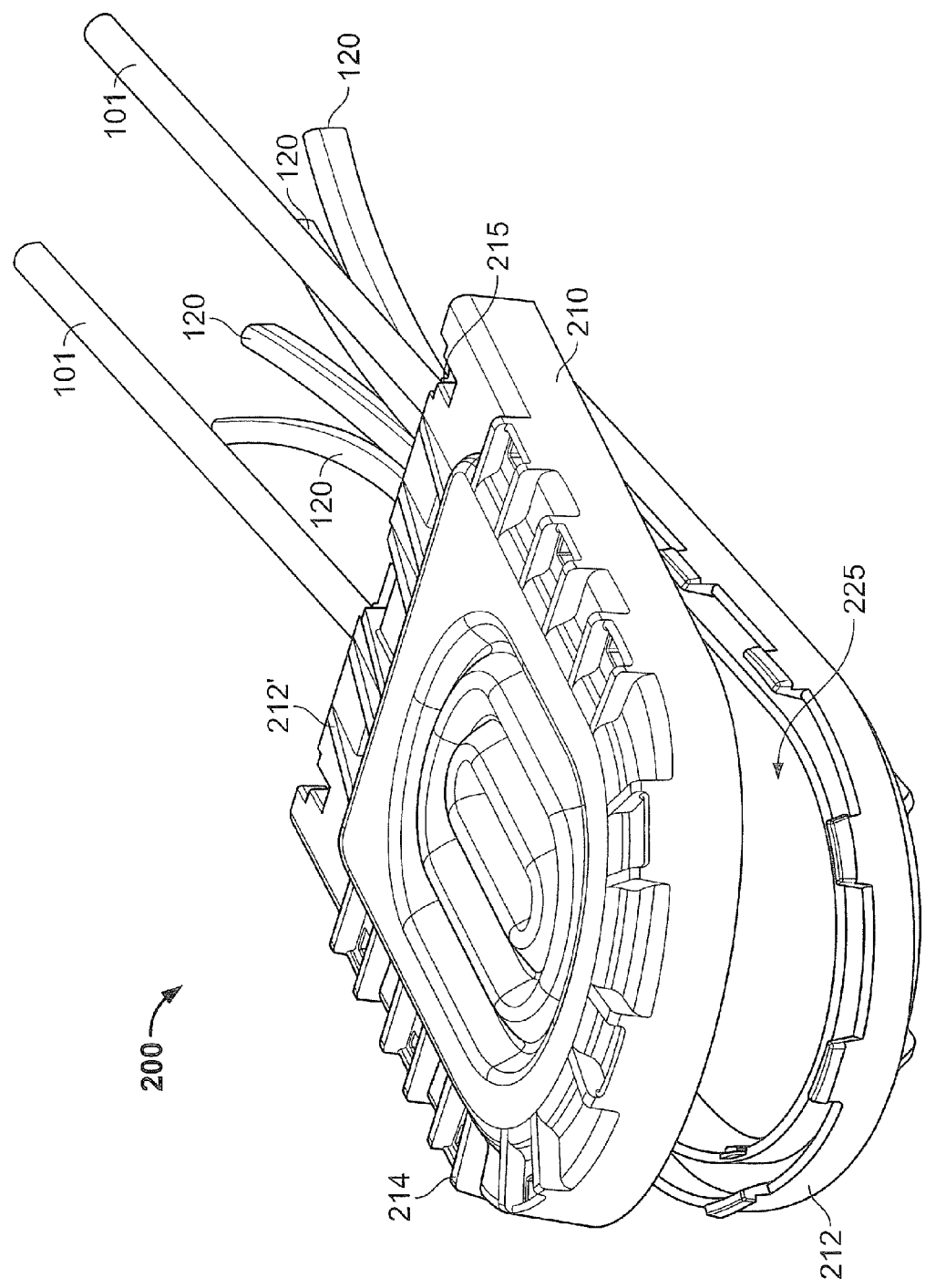
FIG. 2 is a perspective view illustrating an butt style multi-drop closure system according to some embodiments of the present invention.
Figure 3:
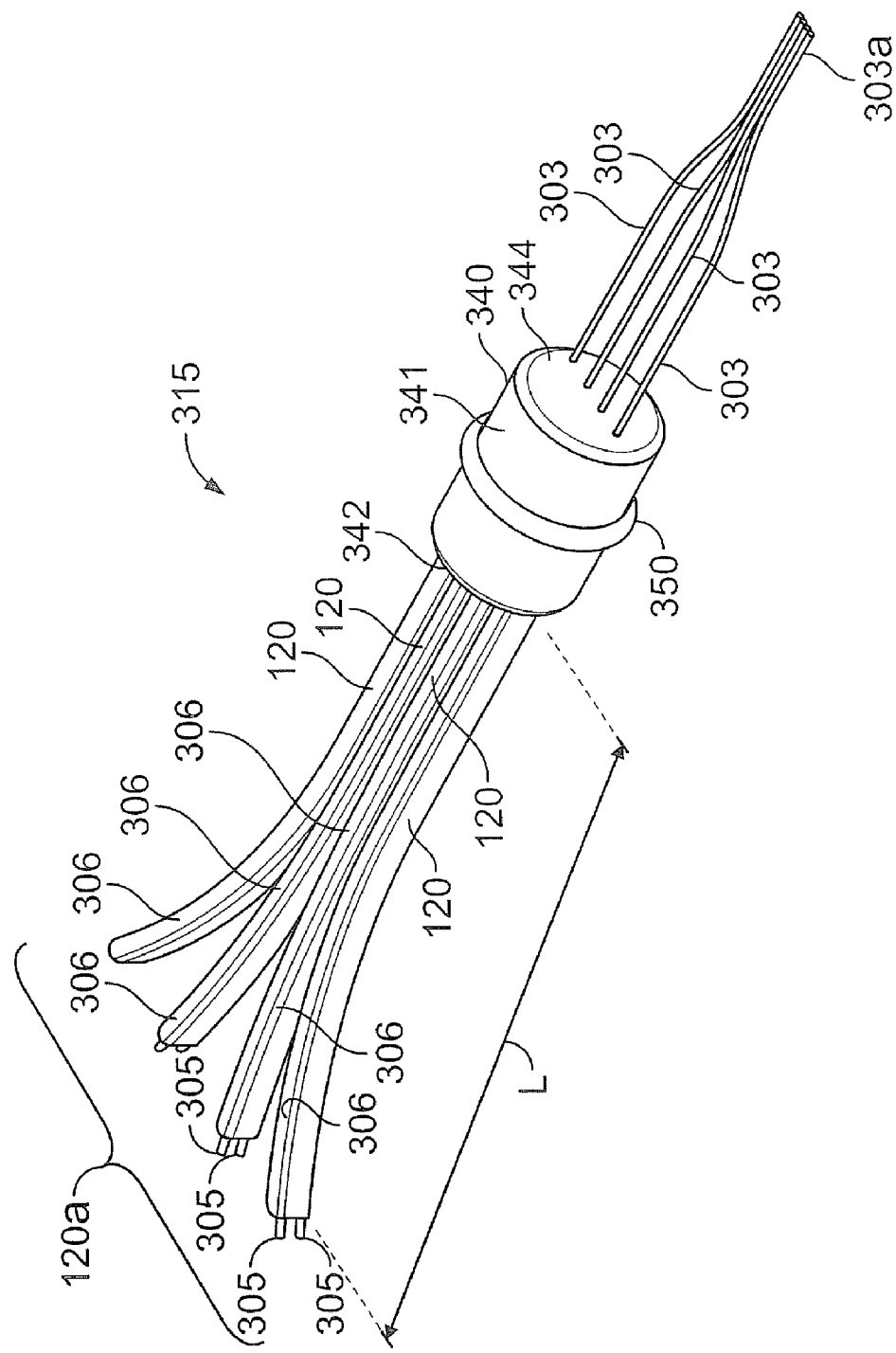
FIG. 3 is a perspective view illustrating a ganged drop plug that may be used with the multi-drop closure systems of FIGS. 1 and 2 according to some embodiments of the present invention.
Figure 4:
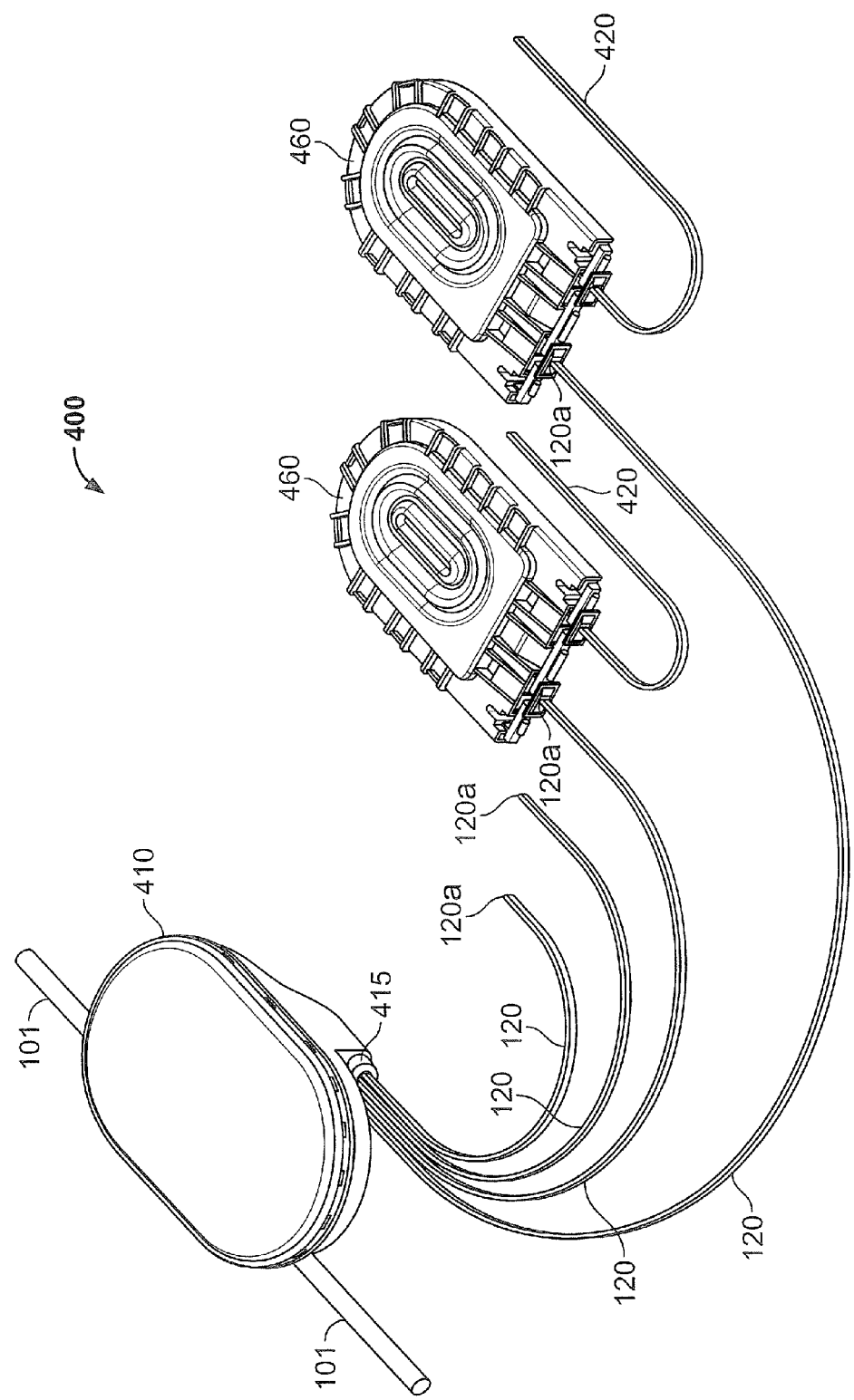
FIG. 4 is a perspective view of a multi-drop closure system including an inline style enclosure with ganged drops in a plug-like device and short length drop cables being spliced to longer length drop cables in smaller secondary enclosures.

In some embodiments, the closure system includes an enclosure including some and/or all of the following features. The closure system may include an enclosure containing two or more entry and/or egress points for fiber optic cables. One entry point may be used for an entering cable (feeder), one may be used for drop cable(s) exit, and in some embodiments, a third may be used for exiting feeder (express) cable. In some embodiments, what is referred to herein as the drop cable exit may in fact include several drop cables, which may be combined such that they essentially exit the closure as a combined composite, or "ganged together" and sealed into a plug-like device, illustrated in FIG. 3, where the plug-like device can then be placed and retained in one of the closure entry/egress ports, as illustrated in FIGS. 1-2 and 4, thus allowing the outdoor protected portions of the fiber optic cable to effectively exit the closure, and the smaller more fragile optical transmission components of the fiber optic cable to enter the closure via the plug-like device. In some embodiments, the enclosure may have a feeder side entry, a ganged drop exit and no express exit point.

In some embodiments, the enclosure has an opening through which a splicer can access the internal area of the enclosure and perform splicing functions on various fibers.

In some embodiments, fiber optic cable and/or multiple fiber optic cables configured such that the fiber optic cables are combined together and sealed into a plug-like device where the plug-like device can then be placed and retained in one of the closure entry/egress ports. This may allow the outdoor protected portions of the fiber optic cable to effectively exit the closure, and the smaller more fragile optical transmission components of the fiber optic cable to enter the closure via the plug-like device. In some embodiments, the plug-like device may be installed upon one or more fiber optic cables, such as flat drop cables, and may be installed in a factory environment (or in the field) and may be of a compact design, and may be sealed to the closure entry port by an O ring and/or similar simplified sealing mechanism. Furthermore, the fiber optic cables that are installed in the plug-like device may have the outer jacket and/or the strength members removed on the side of the plug-like device facing the inside of the closure and (in the case of multiple cables) may have the individual optical fibers combined into ribbon fiber (ribbonized).

In a system of closures, the above embodiments of the present invention may be used to provide a novel method of easily branching out several drop cables from a distribution cable without having a closure with multiple entry ports for each drop cable, and may provide for simplified installation on the distribution cable prior to the time at which each drop cable is required. In some embodiments, the individual drops that are ganged together in the plug-like device may extend for a length of up to hundreds of feet or more in length to enable direct burial at a later date to the subscriber's residence. In some embodiments, the drops may be of a shorter length and may be spliced to another drop cable running to the subscriber's residence. This second splice point may be protected by a simpler smaller closure that is intended for one time use in an arrangement such as seen in FIG. 4. This combined closure configuration may allow a craftsperson to perform a simple splice to one of the short length stubs protruding from the plug-like device at a later time without having to enter the main splice closure and risk interfering with the other fibers in the main distribution cable.

In further embodiments of closure systems and methods according to the present invention, the multiple drop cables are pre-installed in the closure from the factory, and then the distribution cable is spliced into the closure in the field. This may achieve the same end result of having multiple drops protruding from an enclosure upon the distribution cable, except that, in some embodiments, it does not utilize a removable plug-like device as the drops may be permanently pre-installed in the closure.

Embodiments of the present invention will now be further described with reference to FIG. 1. A multi-drop closure system 100 for coupling optical fiber drop cables 120 to an optical fiber main cable 101 at a termination point is shown in FIG. 1. The optical fiber main cable 101 may be, for example, a feed from a service provider central office intended to provide service to individual subscriber locations in various locations in the field. The termination point may be positioned in the proximity of a neighborhood or the like and the drop cables 120 may deliver an optical fiber connection to the subscriber location and/or to a junction box or the like where, for example, a copper connection may be routed for the last leg to the subscriber location.

As shown in FIG. 1, the optical fiber main cable 101 includes a plurality of optical fibers 102, 102a, extending longitudinally within a protective outer sheath of the main cable 101. Two strength members positioned on opposite sides of the optical fibers 102, 102a are also typically provided in the main cable 101 and the optical fibers are typically contained within a central core tube or similar loose buffer tube of the main cable 101. The portion of the cable 101 shown in FIG. 1 corresponds to a termination point, where a slice may be made to the main cable 101, and it will be understood that there are typically drop cables spliced to the main cable 101 at a plurality of longitudinally displaced termination points selected to be positioned at desired locations in the field, such as in a neighborhood or the like.

At the illustrated termination point, a section 101a of the main cable 101 has at least a portion of outer cable sheath removed to allow access to the optical fibers 102, 102a within the system 100. The fiber optic drop cables 120 may include a buffer tube or the like containing at least one optical fiber 103 having an end portion extending outwardly from the end of the drop cable 120 and into the system 100. The optical fiber(s) 103, like the plurality of optical fibers 102, 102a, may be ribbon cables. The optical fibers 103 are spliced to selected severed optical fiber(s) 102 of the plurality of optical fibers 102, 102a of the main cable 101 within the system 100 with an optical fiber splice 127 to couple the main cable 101 and drop cable 120 fiber or fibers.

As shown in the embodiments of FIG. 1, the multi-drop closure system 100 includes an enclosure 110 and a ganged drop plug 115. The enclosure 110 defines a splice chamber 125 that includes a splice 127 coupling a selected optical fiber 102 of the main cable 101 with a corresponding optical fiber 103 extending from one of a plurality of drop cables 120.

The enclosure 110 includes a pair of main cable access openings 131 that provide an entry opening and exit opening to the splice chamber 125 for the main cable 101. It will be understood that, while tubular openings are shown schematically in FIG. 1, the openings 131 may be wrap around openings or the like allowing an uncut cable 101 to be laid into the enclosure 110. The respective openings 131 are on opposite sides of the enclosure 110 to provide an inline express style enclosure for a termination point on the main cable 101. A drop cable access opening 129 into the splice chamber 125 is also provided that is displaced from the main cable access openings 131. The ganged drop plug 115 is configured to be sealingly inserted into the drop cable access opening 129. The ganged drop plus 115 has a plurality of the drop cables 120 extending therefrom.

For the embodiments of FIG. 1, the enclosure 110 includes a base 112 and a cover 114. The respective main cable access openings are on respective opposite sides 112a, 112b of the base 112. The cover 114 is shown as rotatably coupled to one side of the base 112 so as to move between an open position allowing access for splicing optical fibers in the splice chamber 125 and a closed position extending over a splice access opening 126 to the splice chamber 125 defined by the base 112. In the closed position, the interface between the base 112 and cover 114 may be environmentally sealed so as to allow repeated access to the spliced chamber 125 while maintaining an environmentally sealed space for the splices 127 when the cover 114 is in the closed position. It will be understood, however, that other re-enterable openings to the splice chamber allowing for environmental sealing thereof when the splice area is not being accessed may be used in some embodiments of the present invention.

When the ganged drop plug 115 is inserted in the opening 129 of the base 112, the drop cables fixedly secured in the ganged drop plug extend a selected length to an end 120a displaced from the multi-drop closure system 100. As will be described further herein, the length to the ends 120a may be selected to allow routing to a residential subscriber location or the like without additional cable length being spliced thereto or may be a shorter length that is expected to be spliced to a longer length piece of drop cable in the field. In either case, such subsequent splicing, where needed, may be provided without opening or access to the splice chamber 125.

Further embodiments of a multi-drop closure system 200 will now be described with reference to the perspective view illustration of FIG. 2. The multi-drop closure system 200 is a butt style enclosure where the main cable 101 enters and exits on a same side of the multi-drop closure system 200. As illustrated in the embodiments of FIG. 2, the multi-drop closure system 200 includes an enclosure 210 and a ganged drop plug 215. The enclosure 210 defines a splice chamber 225 therein. More particularly, the illustrated enclosure 210 includes a base 212 and a cover 214 that are rotatably connected on a side 212' of the enclosure 210. The entry opening and exit openings for the main cable 101 are displaced from each other on the common side 212' of the enclosure 210. Furthermore, as shown in the embodiments of FIG. 2, the drop cable access opening receiving the ganged drop plug 215 is located on the same side 212'.

A ganged drop plug 315 for use with a multi-drop closure system 100, 200 according to some embodiments of the present invention will now be described further with reference to the perspective view of FIG. 3. As shown in the embodiments of FIG. 3, the ganged drop plug 315 includes a unitary plug body (body portion) 340 having the drop cables 120 fixedly secured therein. A sealing member 350, shown as an O-ring 350 in FIG. 3, is positioned on an outer circumference 341 of unitary plug body 340. The O-ring 350 sealingly engages a mating sealing surface of the enclosure 110, 210 when positioned in the drop cable access opening 129.

The drop cables 120 each include an outer jacket 306 with at least one of the optical fibers 103 therein. Each of the drop cables 120 may further include at least one strength member 305 therein. As shown in FIG. 3, the drop cables 120 are flat drop cables having a pair of strength members 305 on opposite sides thereof. The drop cables 120 extend from an outer face 342 of the unitary plug body 340 so as to extend away from the splice chamber 125, 225 when the ganged drop plug 315 is inserted into the drop cable access opening 129.

The respective optical fibers 103, 303 extend from an opposite interface 344 of the unitary plug body 340 with the outer jacket 306 removed therefrom. As such, the optical fibers 103, 303 may extend into the splice chamber 125, 225 when the ganged drop plug 315 is inserted in the drop cable access opening. As with the drop cables 120 extending from the outer face 342, buffer tubes (not shown) containing the optical fibers 303 illustrated in the embodiments of FIG. 3 may likewise be fixedly secured in the unitary plug body 340. However, the optical fibers 303 themselves will generally be allowed to move longitudinally relative to the plug body 340 to accommodate thermal expansion/contraction and the like without damage to the optical fibers 303. Furthermore, in the embodiments of FIG. 3, the respective optical fibers 303 are ribbonized to form an optical fiber ribbon 303a after extending from the inner face 344 of the unitary plug body 340. Also shown in the embodiments of FIG. 3, the outer jackets 306 and strength members 305 do not extend from the inner face 344 of the unitary plug body 340.

As shown in FIG. 3, the drop cables 120 extend from the outer face 342 of the unitary plug body 340 a distance L to an end 120a of the respective drop cables 120 displaced from the multi-drop closure system enclosure into which the gang drop plug 315 is inserted. In some embodiments, the distant L is selected to allow extension of the drop cables 120 to respective subscriber locations without a splice between the enclosure 110, 210 and the subscriber location. For example, L may be a distance of 100' or more. However, as the length L extends, the convenience of working with the ganged drop plug 315 may become more cumbersome. In some embodiments, the ganged drop plugs 315 are pre-formed in a factory, and the distance L is a limited distance selected to be spliced to another cable to allow extension of the optical connection associated with the drop cable to a subscriber location as will be further described with reference to FIG. 4.

Referring now to the embodiments shown in the perspective view of FIG. 4, main cable 101 is shown entering and exiting an enclosure 410 generally corresponding to the enclosure 100 discussed with reference to FIG. 1. A ganged drop plug 415 is shown inserted into the enclosure 410 that generally corresponds to the ganged drop plug 315 described with reference to FIG. 3.

Also shown in the embodiments of FIG. 4 are a plurality of splice enclosures 460. Each of the splice enclosures 460 is configured to splice at least one of the drop cables 120 extending from an outer face of the ganged drop plug 415. As more particularly shown in FIG. 4, two splice enclosures 460 are used to splice the ends 120a of two of four drop cables 120 to respective further cables 420 to extend the length of the respective drop cables 120. The splice enclosures 460 arc shown as butt style one time use splice enclosures not configured for repeated reentry. However, it will be understood that re-entrable enclosures may be used for the splice enclosures 460 in some embodiments.

Each of the embodiments described in detail with respect to FIGS. 1-4 include the use of a ganged drop plug in combination with an enclosure. However, as discussed above, some embodiments of the present invention may provide similar benefits through the use of a factory pre-formed enclosure not requiring separate fabrication of a ganged drop plug.

As such, an enclosure substantially as described above for defining a spliced chamber and having openings for main cable access to extend to the splice chamber may provide for a plurality of drop cable access openings in the enclosure extending into the splice chamber where the respective drop cable access openings are displaced from the main cable access opening(s). A plurality of drop cables of a selected length are fixedly and sealingly positioned in corresponding ones of the drop cable access openings and extend therefrom away from the enclosure. As described above, the fixedly and sealingly positioned drop cables may have a length sufficient to reach an end location without a splice or may be used in combination with splice enclosures as illustrated, for example, in FIG. 4. Such embodiments may include various features described previously with respect to embodiments including a ganged drop plug, such as ribbonized optical fibers extending into the splice chamber, an inline express and/or butt style enclosure configurations or the like.

Figure 5:
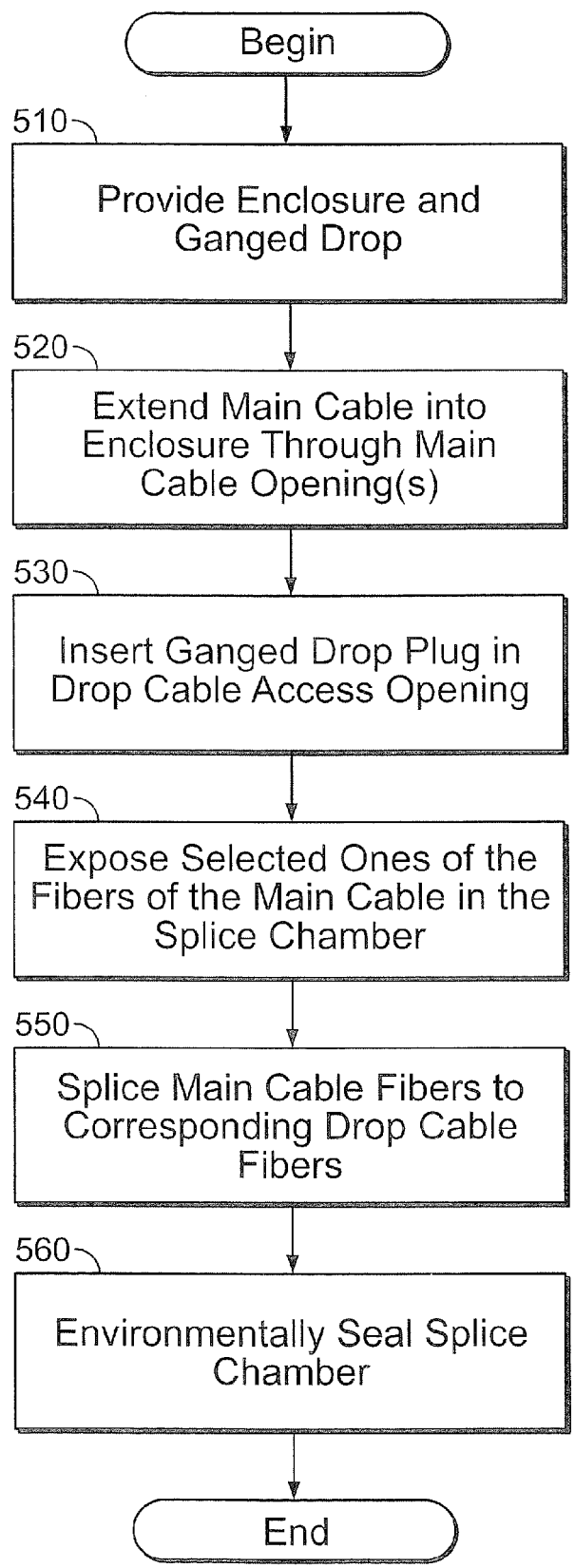
FIG. 5 is a flowchart illustrating operations for terminating an optical fiber cable according to some embodiments of the present invention.

A method of terminating an optical fiber cable according to some embodiments of the present invention will now be described with reference to the flowchart illustration of FIG. 5. As shown for the embodiments of FIG. 5, operations begin at block 510 by providing an enclosure defining a splice chamber therein and having a main cable access opening and a drop cable access opening into the splice chamber. The drop cable access opening is displaced from the main cable access opening or openings. A ganged drop plug is provided that is configured to be sealingly inserted into the drop cable access opening of the enclosure (block 510).

The ganged drop plug has a plurality of drop cables extending therefrom that are fixedly secured in the ganged drop plug. Each of the dropped cables includes an outer jacket with at least one optical fiber therein and the drop cables extend from an outer face of the gang drop plug so as to extend away from the splice chamber when the gang drop plug is inserted in the cable access opening of the enclosure. The respective optical fibers extend from an opposite interface of the ganged drop plug with the outer jackets removed therefrom so as to extend into the splice chamber when the gang drop plug is inserted in the drop cable access opening.

A main cable is extended into the main cable access opening of the enclosure (block 520). As described above, operations at block 520 may include routing a through cable inline from an entry opening to an exit opening that are provided as the main cable access opening. Butt style closures may also be utilized as described with reference to FIG. 2 above.

The ganged drop plug is inserted in the drop cable access opening with the optical fibers of the drop cables extending into the splice chamber (block 530). Selected ones of the plurality of optical fibers of the main cable are exposed inside the splice chamber to allow splicing thereto (block 540). Ones of the optical fibers of the drop cables are spliced to corresponding ones of the selected optical fibers of the main cable in the splice chamber (block 550). The splice chamber is then environmentally sealed (block 560). As described with reference to the perspective view of FIG. 4, in some embodiments, operations may further include splicing ends of the optical fibers of the drop cables that are opposite ends of the optical fibers spliced in the optical fibers of the main cable to optical fiber drop cables extending to customer locations in a separate splice closure displaced from the main enclosure.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A multi-drop closure system for fiber optic cabling, comprising:
    an enclosure defining a splice chamber therein and having a main cable access opening and a drop cable access opening into the splice chamber, the drop cable access opening being displaced from the main cable access opening; and
    a ganged drop plug configured to be sealingly inserted into the drop cable access opening, the ganged drop plug having a plurality of drop cables extending therefrom, wherein the ganged drop plug comprises a unitary plug having the drop cables fixedly secured therein, wherein each of the drop cables includes an outer jacket with at least one optical fiber therein and wherein an outer surface of each of the outer jackets is sealingly received in the ganged drop plug and an outer circumference of the ganged drop plug is configured to be sealingly coupled to the drop cable access opening when the ganged drop plug is inserted into the drop cable access opening and wherein the ganged drop plug is pre-formed in a factory and wherein the drop cables extend from an outer face of the pre-formed ganged drop plug a limited distance selected to be spliced to another cable to allow extension thereof in use to a subscriber location.

2. The multi-drop closure system of claim 1, wherein the drop cables extend from an outer face of the ganged drop plug so as to extend away from the splice chamber when the ganged drop plug is inserted in the drop cable access opening, wherein the respective optical fibers extend from an opposite inner face of the ganged drop plug with the outer jackets removed therefrom so as to extend into the splice chamber when the ganged drop plug is inserted in the drop cable access opening.

3. The multi-drop closure system of claim 2, wherein the respective optical fibers are first ribbonized after extending from the inner face of the ganged drop plug and the respective optical fibers are not ribbonized before extending from the inner face of the ganged drop plug.

4. The multi-drop closure system of claim 2, wherein the outer jackets do not extend from the inner face of the ganged drop plug.

5. The multi-drop closure system of claim 2, wherein the main cable access opening comprises a main cable entrance opening and a main cable exit opening and wherein the system further comprises:
    a fiber optic main cable having a strength member and a plurality of optical fibers extending therein within an outer cable sheath, the main cable extending through the splice chamber from the main cable entrance opening to a main cable exit opening; and
    wherein ones of the optical fibers of the main cable are spliced to corresponding ones of the optical fibers of the drop cables.

6. The multi-drop closure system of claim 1, wherein the ganged drop plug further comprises a sealing member positioned on the outer circumference thereof that sealingly engages a mating sealing surface of the enclosure positioned in the drop cable access opening.

7. The multi-drop closure system of claim 6, wherein the sealing member comprises an O-ring.

8. The multi-drop closure system of claim 1, wherein the enclosure further comprises a splice access opening that is sized to allow access for splicing optical fibers in the splice chamber.

9. The multi-drop closure system of claim 8, wherein the enclosure includes a base and a cover and wherein the cover extends over the splice access opening and has a closed position covering the splice access opening and an open position allowing access for splicing optical fibers in the splice chamber.

10. The multi-drop closure system of claim 1, wherein the enclosure comprises an inline express enclosure and wherein the main cable access opening comprises:
   an entry opening on a first side of the enclosure; and
   an exit opening on a second side of the enclosure, opposite the first side.

11. The multi-drop closure system of claim 1, wherein the enclosure comprises a butt enclosure and wherein the main cable access opening comprises an entry opening and an exit opening displaced therefrom on a same side of the enclosure and wherein the drop cable access opening is on the same side of the enclosure as the entry and exit openings.

12. The multi-drop closure system of claim 1, further comprising a plurality of splice enclosures, each of which is configured to splice at least one of the drop cables extend from the outer face of the pre-formed ganged drop plug to another cable.

13. A multi-drop closure system for fiber optic cabling, comprising:
   an enclosure defining a splice chamber therein and having a main cable access opening and a drop cable access opening into the splice chamber, the drop cable access opening being displaced from the main cable access opening; and
   a ganged drop plug configured to be sealingly inserted into the drop cable access opening, the ganged drop plug having a plurality of drop cables extending therefrom, wherein each of the drop cables includes an outer jacket with at least one optical fiber therein, wherein the drop cables extend from an outer face of the ganged drop plug so as to extend away from the splice chamber when the ganged drop plug is inserted in the drop cable access opening, wherein the respective optical fibers extend from an opposite inner face of the ganged drop plug with the outer jackets removed therefrom so as to extend into the splice chamber when the ganged drop plug is inserted in the drop cable access opening and wherein each of the drop cables includes at least one strength member therein and wherein the strength members do not extend from the inner face of the ganged drop plug.

14. The multi-drop closure system of claim 13, wherein the drop cables extend from an outer face of the ganged drop plug a distance selected to allow extension thereof to a subscriber location without a splice between the enclosure and the subscriber location.

15. A multi-drop closure system for fiber optic cabling, comprising:
   an enclosure defining a splice chamber therein and having a main cable access opening and a drop cable access opening into the splice chamber, the drop cable access opening being displaced from the main cable access opening;
   a ganged drop plug configured to be sealingly inserted into the drop cable access opening, the ganged drop plug having a plurality of drop cables extending therefrom, wherein the ganged drop plugs are pre-formed in a factory and wherein the drop cables extend from an outer face of the pre-formed ganged drop plug a limited distance selected to be spliced to another cable to allow extension thereof in use to a subscriber location; and
   a plurality of splice enclosures, each of which is configured to splice at least one of the drop cables extend from the outer face of the pre-formed ganged drop plug to another cable, wherein the plurality of splice enclosures comprise one time use splice enclosures not configured for repeated re-entry.

* * * * *